US012678888B2

(12) United States Patent　(10) Patent No.:　US 12,678,888 B2
Hermani et al.　(45) Date of Patent:　Jul. 14, 2026

(54) METHOD AND PROCESSING MACHINE FOR WORKPIECE POSE DETECTION BY MEANS OF OCT

(71) Applicant: TRUMPF Laser GmbH, Schramberg (DE)

(72) Inventors: Jan-Patrick Hermani, Markgroeningen (DE); Nicolai Speker, Pleidelsheim (DE); Martin Stambke, Dunningen (DE)

(73) Assignee: TRUMPF LASER GMBH, Schramberg (DE)

( * ) Notice: Subject to any disclaimer, the term of this patent is extended or adjusted under 35 U.S.C. 154(b) by 951 days.

(21) Appl. No.: 17/961,568

(22) Filed: Oct. 7, 2022

(65) Prior Publication Data

US 2023/0029522 A1　Feb. 2, 2023

Related U.S. Application Data

(63) Continuation of application No. PCT/EP2021/059212, filed on Apr. 8, 2021.

(30) Foreign Application Priority Data

Apr. 9, 2020　(DE) ..................... 10 2020 204 622.0

(51) Int. Cl.
| | |
|---|---|
| *B23K 26/03* | (2006.01) |
| *B23K 26/04* | (2014.01) |
| *B23K 26/21* | (2014.01) |

(52) U.S. Cl.
CPC .............. *B23K 26/03* (2013.01); *B23K 26/04* (2013.01); *B23K 26/21* (2015.10)

(58) Field of Classification Search
CPC ........ B23K 26/03; B23K 26/04; B23K 26/21; B23K 26/035; B23K 15/0013;
(Continued)

(56) References Cited

U.S. PATENT DOCUMENTS

| | | |
|---|---|---|
| 2015/0338210 A1 | 11/2015 | Lessmüller et al. |
| 2017/0115656 A1 | 4/2017 | Ottnad et al. |

(Continued)

FOREIGN PATENT DOCUMENTS

| | | |
|---|---|---|
| CN | 103878478 A | 6/2014 |
| CN | 105277568 A | 1/2016 |

(Continued)

OTHER PUBLICATIONS

Ye Jianbin et al., "Laser Cutting Technology," Advanced Manufacturing Techology and Application Frontier, Jul. 2012, pp. 196-199, Shanghai Scientific & Technical Publishers, Shanghai, China.

*Primary Examiner* — Jose L Couso
(74) *Attorney, Agent, or Firm* — LEYDIG, VOIT & MAYER, LTD.

(57)　ABSTRACT

A method for processing a workpiece includes the steps of arranging the workpiece in a work space and guiding an OCT measurement beam of an optical coherence tomograph using a processing head so as to scan the workpiece, wherein the pose of the processing head in the work space and also the pose of the OCT measurement beam relative to the processing head are known. Distance measurement values of the optical coherence tomograph are determined during the scanning, which are used to determine at least one of the pose of the workpiece in the workspace, the presence of a workpiece in the workspace, the identity of the workpiece in the workspace, and the presence of a processing feature of the workpiece that was carried out on the workpiece in a previous processing step.

9 Claims, 1 Drawing Sheet

(58) Field of Classification Search
CPC .. B23K 26/032; B23K 26/042; B23K 26/046; B23K 26/048; B23K 26/62; B23K 26/082; B23K 31/125; B23K 26/702; G01B 5/0037; G01B 9/0203; G01B 9/02; G01B 9/02004; G01B 9/02028; G01B 9/0244; G01B 9/0287; G01B 11/0209; G01B 9/02091; G01B 11/026; G01B 11/03; G01B 11/0608; G01B 11/0675; G01B 11/14; G01B 11/2441; G01B 9/02063; G01B 9/02083; G01J 2003/2826; G01J 3/2823; G06T 2207/10036; G06T 2207/10101; G06T 2207/20221; G06T 2207/30164; G06T 7/0004; G06T 7/73; G06T 7/62; G06T 3/4046; G06T 5/60; G06T 9/002; G06T 2207/20076; G06T 2207/20081; G06T 2207/20084; G06T 2211/441; G06V 10/772; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; H01L 22/12; G01N 2021/8825; G01N 21/4795; G01N 21/88; G01N 21/8806; G01N 21/95; G01N 21/9501; G01N 21/95623; G01R 31/2831; G01R 31/308; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06F 18/213; G06F 18/214; G06F 18/22; G06F 18/241; G06F 18/24; G06F 18/2411; G06F 18/2415; G06F 18/253; G06F 30/27; Y10S 128/925
See application file for complete search history.

(56) References Cited

U.S. PATENT DOCUMENTS

| | | | |
|---|---|---|---|
| 2017/0120337 A1* | 5/2017 | Kanko | B23K 15/0013 |
| 2018/0143147 A1 | 5/2018 | Milner et al. | |
| 2019/0001655 A1 | 1/2019 | Blom et al. | |
| 2019/0137252 A1* | 5/2019 | Trenholm | G01B 11/2441 |
| 2020/0130103 A1 | 4/2020 | Choi et al. | |

FOREIGN PATENT DOCUMENTS

| | | |
|---|---|---|
| CN | 107953037 A | 4/2018 |
| CN | 109794687 A | 5/2019 |
| CN | 110919134 A | 3/2020 |
| DE | 102010060958 A1 | 6/2012 |
| DE | 102013015656 A1 | 3/2015 |
| DE | 102015012565 B3 | 10/2016 |
| DE | 102015114715 A1 | 3/2017 |
| DE | 102016001661 B3 | 4/2017 |
| DE | 102018115434 A1 | 1/2019 |
| EP | 2693165 A1 | 2/2014 |
| JP | 2014106167 A | 6/2014 |
| JP | 2017189809 A | 10/2017 |
| WO | WO 2019236108 A1 | 12/2019 |

* cited by examiner

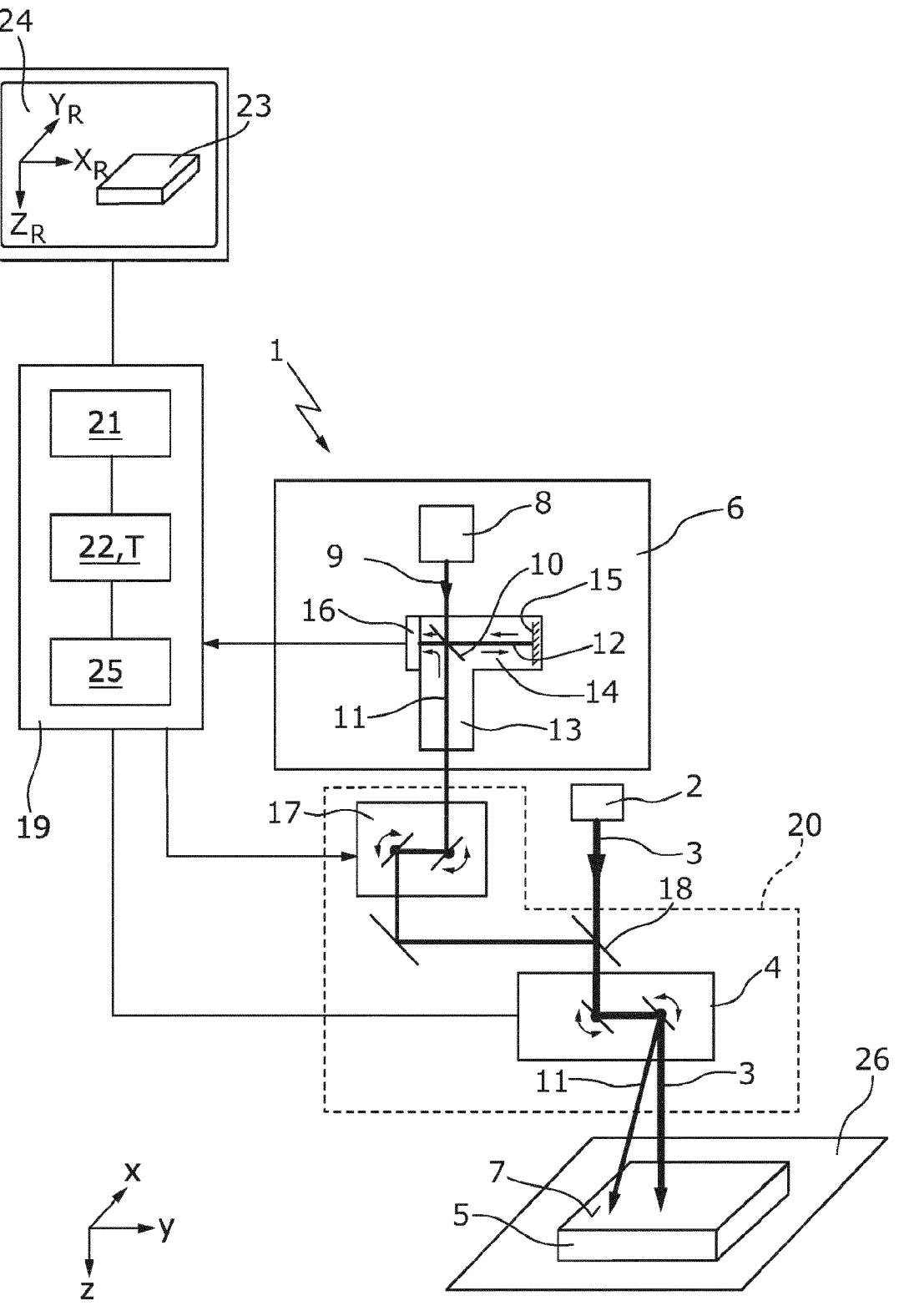

METHOD AND PROCESSING MACHINE FOR WORKPIECE POSE DETECTION BY MEANS OF OCT

CROSS REFERENCE TO RELATED APPLICATIONS

This application is a continuation of International Application No. PCT/EP2021/059212 (WO 2021/204960 A1), filed on Apr. 8, 2021, and claims benefit to German Patent Application No. DE 10 2020 204 622.0, filed on Apr. 9, 2020. The aforementioned applications are hereby incorporated by reference herein.

FIELD

The present invention relates to a method for processing a workpiece by means of a processing beam, such as e.g. a laser beam.

BACKGROUND

In certain applications it is necessary to ascertain the pose, i.e. the position and the orientation, of a workpiece to be processed in relation to a coordinate system. One example of such an application is the determination of the pose of a workpiece to be processed by means of an industrial robot relative to the industrial robot or to the coordinate system thereof. In the prior art, the control or path programming for laser robots is effected by teaching. That involves moving to so-called teach points manually on the workpiece, along the contour to be processed, by a procedure in which an employee standing in the workspace of the robot moves to positions on the workpiece, point by point, and checks by eye or by means of laser pointers as to whether a laser processing head from which a laser beam emerges during the laser processing is situated above a target path point. In this way, the movement path of the robot is "programmed" or traversed point by point, which is particularly time-consuming.

EP 2 693 165 A1 discloses a method for ascertaining the pose of an object by means of a light section sensor that emits light that generates a light line on a surface. A search pass is carried out by automatically moving the light section sensor with a movement component at right angles to the light line and at right angles to the light exit direction by means of a movement device. Image data are acquired by means of the light section sensor during the search pass. The image data are evaluated, and a prominent location, in particular an outer edge, of the object is recognized on the basis of the evaluated image data. The pose of the object is ascertained on the basis of that position of the light section sensor which is assigned to the prominent location of the object, and on the basis of evaluating the image data assigned to the prominent location of the object.

Furthermore, DE 10 2015 114 715 A1 discloses a coordinate system in which the component geometry is detected by means of short-coherence interferometry.

Finally, DE 10 2013 015 656 A1 discloses a method for measuring the penetration depth of a laser beam into a workpiece by means of an optical coherence tomograph.

SUMMARY

In an embodiment, the present disclosure provides a method for processing a workpiece that includes arranging the workpiece in a work space and guiding an OCT measurement beam of an optical coherence tomograph using a processing head so as to scan the workpiece, wherein the pose of the processing head in the work space and also the pose of the OCT measurement beam relative to the processing head are known. Distance measurement values of the optical coherence tomograph are determined during the scanning, which are used to determine at least one of the pose of the workpiece in the workspace, the presence of a workpiece in the workspace, the identity of the workpiece in the workspace, and the presence of a processing feature of the workpiece that was carried out on the workpiece in a previous processing step.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows a laser processing machine for carrying out the method according to the invention.

DETAILED DESCRIPTION

Against this background, an aspect of the invention is based on the object of specifying a method for processing a workpiece by means of a processing beam in which features of a workpiece to be processed can be determined. In particular, it is desired that the pose, i.e. the position and the orientation, of a workpiece to be processed in the work space can be detected in an automated manner, i.e. without manual teaching, and the workpiece is then processed according to its detected pose.

In an aspect, the present invention provides a method for processing a workpiece by means of a processing beam that emerges from a processing head, the workpiece and the processing head being movable relative to one another in a work space, comprising the following method steps:

automated scanning of a workpiece to be processed, which is arranged in the work space, by means of an OCT measurement beam of an optical coherence tomograph (optical coherence tomography, OCT), said beam being guided by way of the processing head, the pose of the processing head in the work space and also the pose of the OCT measurement beam relative to the processing head being known in each case;

determining at least one of the following features on the basis of distance measurement values of the optical coherence tomograph that are ascertained during the automated scanning:

the pose of the workpiece to be processed in the workspace;

the presence of a workpiece to be processed in the workspace;

the presence of the correct workpiece to be processed in the workspace; and the presence of a processing feature of the workpiece to be processed, said processing feature having been carried out in a previous processing step on the workpiece (e.g. whether a previously manufactured bending radius is correct or not).

During the relative movement of workpiece and processing head, either only the workpiece or only the processing head or both can be moved.

According to an aspect of the invention, the OCT measurement method is used to measure features of a workpiece to be processed, such as e.g. the workpiece pose in the work space, in an automated manner. The OCT measurement technique is an optical measurement method which is used nowadays for measuring the welding depth or for measuring the position of welding edges. Since the OCT measurement beam is guided, in particular coaxially with respect to the processing beam, by way of the processing head and is part of the processing head, the OCT measurement signal generates distance information concerning a reference point at the processing head, e.g. a tool center point, TCP. The pose of the workpiece to be processed in the work space can be derived from the position of the robot axes and the dimensions of the welding head.

Particularly preferably, the method according to the invention comprises the following further method steps:

ascertaining a coordinate transformation between the determined workpiece pose and the pose of a CAD model of the workpiece to be processed in a CAD coordinate system;

transforming a processing path of the processing head programmed for the CAD model in the CAD coordinate system to the determined pose of the workpiece to be processed by means of the ascertained coordinate transformation; and processing the workpiece by means of the processing beam by moving the processing head relative to one another along the transformed processing path.

The measured workpiece pose may be compared with the pose of the CAD model of the workpiece to be processed in the CAD coordinate system. By way of coordinate transformation, the NC path programming of the processing head is transferred from the CAD coordinate system to the measured workpiece pose. This affords one or more of the following possible advantages:

the teaching process is obviated;

the first processed workpiece may be arrived at more rapidly in a time-saving manner;

lower risk of incorrect operation;

offline programming for robots;

construction of the processing machine is simplified, e.g. through simple clamping means, since an exactly repeatable workpiece pose is not required.

Preferably, the OCT measurement beam is deflected one- or two-dimensionally in order to scan the workpiece with the OCT measurement beam. In contrast to light section-based methods, in the case of the OCT-based method according to the invention, a scanning figure traversed on the workpiece surface by the OCT measurement beam can be altered arbitrarily.

With further preference, the processing head can be moved in order to scan the workpiece with the measurement beam.

The invention also relates to a processing machine for processing a workpiece by means of a processing beam, in particular a processing laser beam, comprising:

a processing beam generator for generating a processing beam, an optical coherence tomograph for generating an OCT measurement beam, an OCT scanner for one- or two-dimensionally deflecting the OCT measurement beam, a processing head, from which the processing beam and the deflected OCT measurement beam emerge, and a machine controller for controlling the scanner movement of the OCT scanner.

According to the invention, the machine controller comprises:

a pose determining unit for determining the pose of the workpiece to be processed in the work space on the basis of distance measurement values of the optical coherence tomograph, an ascertaining unit for ascertaining a coordinate transformation between the determined workpiece pose and the pose of a CAD model of the workpiece to be processed in a CAD coordinate system, a transformation unit for transforming a processing path of the processing head programmed for the CAD model in the CAD coordinate system to the determined pose of the workpiece to be processed by means of the ascertained coordinate transformation, the machine controller being programmed to carry out the above-described method according to the invention.

The processing head can be immobile or, with this being preferred, movable, in the latter case the machine controller also controlling the movement of the processing head. Either a single machine controller or two separate controllers, which communicate with one another, can be present.

Particularly preferably, the optical coherence tomograph and the OCT scanner are secured to the processing head.

Finally, the invention also relates to a computer program product comprising code means adapted for carrying out all of the steps of the method according to the invention when the program runs on a machine controller of a processing machine, e.g. on the controller of the processing beam generator or of the processing head, or else on a separate machine controller.

Further advantages and advantageous configurations of the subject matter of the invention can be gathered from the description, the drawings and the claims. Likewise, the features mentioned above and those that will be explained further can be used in each case by themselves or as a plurality in any desired combinations. The embodiments shown and described should not be understood as an exhaustive enumeration, but rather are of illustrative character for outlining the invention.

The laser processing machine 1 shown schematically in FIG. 1 comprises a laser beam generator 2 for generating a processing laser beam 3, a laser scanner 4 for two-dimensionally deflecting the processing laser beam 3 in x-, y-directions on a workpiece 5, and also an optical coherence tomograph (OCT) 6 for optically scanning a region of the surface 7 of the workpiece 5. The laser scanner 4 can have for example one scanner mirror deflectable about two axes, or two scanner mirrors each deflectable about one axis.

The OCT 6 has in a known manner an OCT light source (e.g. superluminescence diode) 8 for generating a light beam 9, a beam splitter 10 for splitting the light beam 9 into an OCT measurement beam 11 and a reference beam 12. The OCT measurement beam 11 is forwarded to a measuring arm 13 and impinges on the workpiece surface 7, at which the OCT measurement beam 11 is at least partly reflected and guided back to the beam splitter 10, which is nontransmissive or partly transmissive in this direction. The reference beam 12 is forwarded to a reference arm 14 and reflected by a mirror 15 at the end of the reference arm 14. The reflected reference beam is likewise guided back to the beam splitter 10. The superimposition of the two reflected beams is finally detected by a detector (OCT sensor) 16 in order, taking account of the length of the reference arm 14, to ascertain height information about the workpiece surface 7 and/or the current penetration depth of the processing laser beam 3 into the workpiece 5. This method is based on the fundamental principle of the interference of light waves and makes it possible to detect height differences along the measurement beam axis in the micrometers range.

Adjacent to the measuring arm 13 there follows an OCT (small field) scanner 17 in order to deflect the OCT measurement beam 11 two-dimensionally, i.e. in x-, y-directions, on the workpiece surface 7 and thus to scan a region of the workpiece surface 7 with line scans, for example. The OCT scanner 17 can have for example one scanner mirror deflectable about two axes, or two scanner mirrors each deflectable about one axis. Via a mirror 18 that is arranged obliquely in the beam path of the processing laser beam 3 and is transmissive for the processing laser beam 3 and reflective for the OCT measurement beam 11, the OCT measurement beam 11 is coupled into the laser scanner 4 in order to direct the OCT measurement beam 11 onto the workpiece 5. The sensor data of the OCT sensor 16 are passed to a machine controller 19, which also controls the movement of the scanners 4, 17.

As indicated by dashed lines in FIG. 1, the laser scanner 4 and the OCT scanner 17 (optionally also the OCT 6) are integrated in a movable processing head 20, from which the processing laser beam 3 and the deflected OCT measurement beam 11 emerge. The processing laser beam 3 and the OCT measurement beam 11 can be fed to the processing head 3 via optical fibers (not shown). The movement of the processing head 20 is likewise controlled by the machine controller 19.

The workpiece 5 and the processing head 20 are movable relative to one another; for this purpose, either the workpiece 5 or the processing head 20 or both is/are movable.

The machine controller 19 comprises:

a pose determining unit 21 for determining the pose of the workpiece 5 to be processed in the work space on the basis of distance measurement values of the optical coherence tomograph 6, an ascertaining unit 22 for ascertaining a coordinate transformation T between the determined workpiece pose and the pose of a CAD (null) model 23 of the workpiece 5 to be processed in a CAD coordinate system 24 (reference coordinates XR, YR, ZR) and a transformation unit 25 for transforming a processing path of the processing head 20 programmed for the CAD model 23 in the CAD coordinate system 24 to the determined pose of the workpiece 5 (real component) to be processed by means of the ascertained coordinate transformation T.

For processing a workpiece 5, the exact pose of which in the work space (e.g. the exact pose on a workpiece table 26) is not known, by means of the processing laser beam 3, the following procedure is adopted.

The processing head 20, the pose of which in the work space is known, is initially positioned above the workpiece table 26 or the workpiece 5. The first search step then starts, wherein the OCT measurement beam 11, the pose of which relative to the processing head 20 is likewise known, is moved through the field of view volume of the OCT 6 by means of the OCT scanner 17. In the case where a component geometry has not yet been detected, the processing head 20 or the OCT 6 is moved closer to the workpiece table 26 by a fixed increment movement in the Z-direction. The process is repeated in an automated manner until the workpiece 5 is detected. Optionally, the search process is supplemented by moving the processing head 20 in the X-Y-plane. Point by point the OCT field of view volume is scanned and the workpiece 5 lying in the field of view is recognized in this way. Each positive distance measurement event corresponds to a spatial point corresponding to a point on the workpiece surface 7. The sum of all the component surface points corresponds in the totality thereof to the workpiece 5. On the basis of the distance measurement values, the pose determining unit 21 determines the pose of the workpiece 5 to be processed in the work space. The ascertaining unit 22 ascertains the coordinate transformation T between the determined workpiece pose and the pose of the CAD model 23 in the CAD coordinate system 24. By means of the coordinate transformation T thus ascertained, the transformation unit 25 transforms a processing path of the processing head 20 programmed for the CAD model 23 in the CAD coordinate system 24 and a scanner movement of the laser scanner 4 to the determined pose of the workpiece 5 to be processed. Finally, the workpiece 5 is processed by means of the laser processing beam 3 by the processing head 20 and the laser processing beam 3 being moved along the transformed processing path.

As an alternative or in addition to the described determination of the workpiece pose in the work space, at least one of the following features can also be determined on the basis of distance measurement values of the optical coherence tomograph 6 that are ascertained during the automated scanning:

the presence of a workpiece 5 to be processed in the workspace;

the presence of the correct workpiece 5 to be processed in the workspace; and the presence of a processing feature of the workpiece 5 to be processed, said processing feature having been carried out in a previous processing step on the workpiece 5.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for processing a workpiece comprising the following method steps:

arranging the workpiece in a work space;

guiding an OCT measurement beam of an optical coherence tomograph using a processing head so as to scan the workpiece, wherein the pose of the processing head in the work space and also the pose of the OCT measurement beam relative to the processing head are known;

ascertaining distance measurement values of the optical coherence tomograph during the scanning;

using the distance measurement values to determine at least one of the following features:

the pose of the workpiece in the workspace;

the presence of a workpiece in the workspace;

the identity of the workpiece in the workspace; and the presence of a processing feature of the workpiece that was carried out on the workpiece in a previous processing step;

determining a CAD pose of a CAD model of the workpiece in a CAD coordinate system;

ascertaining a coordinate transformation between the pose of the workpiece pose and the CAD pose;

determining a programmed path of each of the processing head and the processing beam for the CAD model in the CAD coordinate system;

transforming the programmed processing path of the processing head and the processing beam to the pose of the workpiece using the coordinate transformation; and moving the processing head and the processing beam relative to one another along the transformed processing path so as to process the workpiece.

2. The method according to claim 1, wherein the guiding includes deflecting the OCT measurement beam in one or two dimensions so as to scan the workpiece with the OCT measurement beam.

3. The method according to claim 1, wherein the guiding includes moving the processing head so as to scan the workpiece with the OCT measurement beam.

4. A processing machine for processing a workpiece using a processing beam, comprising:

a processing beam generator for generating a processing beam, an optical coherence tomograph for generating an OCT measurement beam, an OCT scanner for deflecting the OCT measurement beam in one or two dimensions, a processing head, the processing beam and the deflected OCT measurement beam emerging from the processing head, and a machine controller configured to control a scanner movement of the OCT scanner, wherein the machine controller comprises:

a pose determining unit configured to determine the pose of the workpiece based on distance measurement values of the optical coherence tomograph, an ascertaining unit configured to ascertain a coordinate transformation between the workpiece pose and a CAD pose of a CAD model of the workpiece in a CAD coordinate system;

a transformation unit configured to transform a processing path of each of the processing head and the processing beam programmed for the CAD model in the CAD coordinate system to the pose of the workpiece using of the coordinate transformation.

5. The processing machine according to claim 4, wherein the processing head is movable and the machine controller controls the movement of the processing head.

6. The processing machine according to claim 4, wherein the OCT scanner is secured to the processing head.

7. The processing machine according to claim 4, wherein the optical coherence tomograph is secured to the processing head.

8. The processing machine according to claim 4, wherein the processing beam is a processing laser beam.

9. A non-transitory computer-readable medium having processor-executable instructions stored thereon, wherein the processor-executable instructions, when executed by one or more processors, facilitate performance of the method according to claim 1.

* * * * *